(12) United States Patent
Borrel et al.

(10) Patent No.: US 10,754,060 B2
(45) Date of Patent: Aug. 25, 2020

(54) SYSTEM, METHOD AND COMPUTER PROGRAM PRODUCT FOR FRACTURE PATTERN CHARACTERIZATION IN NATURALLY FRACTURED RESERVOIRS

(71) Applicant: International Business Machines Corporation, Armonk, NY (US)

(72) Inventors: Paul Borrel, Rio de Janeiro (BR); Paulo Rodrigo Cavalin, Rio de Janeiro (BR); Carlos Raoni de Alencar Mendes, Rio de Janeiro (BR); Matthias Kormaksson, Rio de Janeiro (BR); Carmen Nilda Mena Paz, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 346 days.

(21) Appl. No.: 15/277,883

(22) Filed: Sep. 27, 2016

(65) Prior Publication Data
US 2018/0088252 A1    Mar. 29, 2018

(51) Int. Cl.
| | | |
|---|---|---|
| *G01V 99/00* | (2009.01) | |
| *G06K 9/46* | (2006.01) | |
| *G06K 9/62* | (2006.01) | |
| *G06N 3/02* | (2006.01) | |

(52) U.S. Cl.
CPC ......... *G01V 99/005* (2013.01); *G06K 9/4604* (2013.01); *G01V 2210/646* (2013.01); *G06K 9/6254* (2013.01); *G06N 3/02* (2013.01)

(58) Field of Classification Search
None
See application file for complete search history.

(56) References Cited

U.S. PATENT DOCUMENTS

2017/0364795 A1* 12/2017 Anderson ............ G06N 99/005

OTHER PUBLICATIONS

Wu, J., Boucher, A., & Zhang, T. (2008). A SGeMS code for pattern simulation of continuous and categorical variables: FILTERSIM. Computers & Geosciences, 34(12), 1863-1876. (Year: 2008).*
Pendar, H., Salehi, M. M., Kharrat, R., & Zarezadeh, S. (Jul. 2016). Numerical and ANFIS modeling of the effect of fracture parameters on the performance of VAPEX process. Journal of Petroleum Science and Engineering, 143, 128-140. (Year: 2016).*
Khan, M. A. H., Jailkhani, S., & Kumar, B. P. (Dec. 2012). Applications of cloud computing in remote oil and gas operations. In Cloud Computing Technologies, Applications and Management (ICCCTAM), 2012 International Conference on (pp. 52-55). IEEE. (Year: 2012).*

(Continued)

*Primary Examiner* — Bijan Mapar
(74) *Attorney, Agent, or Firm* — Joseph Petrokaitis, Esq.; McGinn IP Law Group, PLLC (57) ABSTRACT

A fracture pattern characterization method, system, and computer program product, include classifying fracture patterns of reservoir layers using a correlation of reservoir information associated with target images and the target images extracted from a database and determining a fracture pattern characterization of a new reservoir layer input based on the classified fracture patterns.

17 Claims, 5 Drawing Sheets

(56) References Cited

OTHER PUBLICATIONS

Caers, J., & Zhang, T. (2004). Multiple-point geostatistics: a quantitative vehicle for integrating geologic analogs into multiple reservoir models (Year: 2004).*

Kooijman, D. A. (2011). Analysis of Natural Fractures in the Basal Zechstein Carbonates in the Dutch Offshore Area using Wireline Log Data. (Year: 2011).*

Mel, et al. "The NIST Definition of Cloud Computing". Recommendations of the National Institute of Standards and Technology. Nov. 16, 2015.

* cited by examiner

FIG. 1

FRACTURE PATTERN CHARACTERIZATION METHOD 100

| Rank | Most similar Reservoirs | Supporting Data | Fracture Family | Similarity |
|---|---|---|---|---|
| 1 | (Location=Santos – Brazil, Stratigraphic Layer=Carbonate) | Historical Image 1 | (dip=45, strike=35, length=1m, aperture=5mm, morphology=Open) | 0.87 |
| 2 | (Location=Reservoir 2 – Mozambique, Stratigraphic Layer=Carbonate) | Historical Image 2 | (dip=55, strike=15, length=0.7m, aperture=4mm, morphology=Open) | 0.79 |
| 3 | (Location=Reservoir 3 – Mozambique, Stratigraphic Layer=Carbonate) | Historical Image 3 | (dip=60, strike=10, length=0.6m, aperture=3mm, morphology=Open) | 0.77 |
| . | . | | | . |
| . | . | | | . |
| . | . | | | . |

SYSTEM, METHOD AND COMPUTER PROGRAM PRODUCT FOR FRACTURE PATTERN CHARACTERIZATION IN NATURALLY FRACTURED RESERVOIRS

BACKGROUND

The present invention relates generally to a fracture pattern characterization method, and more particularly, but not by way of limitation, to a system, method, and computer program product for content-based image analytics and machine learning for fine-grained reservoir analysis, for better fracture characterization.

One of the necessary input data for reservoir/geomechanics simulation involves a complete fracture pattern characterization of each geological layer of the underlying reservoir. A fracture is a surface of discontinuity of mechanical origin. A fracture family is characterized by its attributes (e.g., dip angle, strike, length, aperture, morphology and origin). The fracture network involves the description of the fracture attributes and investigates the relationship between the different fracture families. The fracture network is characterized by the spatial properties of fractures, such as the number of fracture families, their relative fracture density, the fracture connectivity, etc.

Fracture characterization is conventionally based on experts' analysis and interpretation of results. Typically, the conventional techniques are proprietary and individual to corporations. The analysis is limited to the knowledge of a single expert, and there is no aggregation of cross-expert knowledge because of the proprietary nature of the information. Visual aspects of reservoir seismic data, such as ant-tracking results, are analyzed by human judgement only.

SUMMARY

In an exemplary embodiment, the present invention can provide a computer-implemented fracture pattern characterization method, the method including classifying fracture patterns of reservoir layers using a correlation of reservoir information associated of target images and the target images extracted from a database and determining a fracture pattern characterization of a new reservoir layer input based on the classified fracture patterns.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIG. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
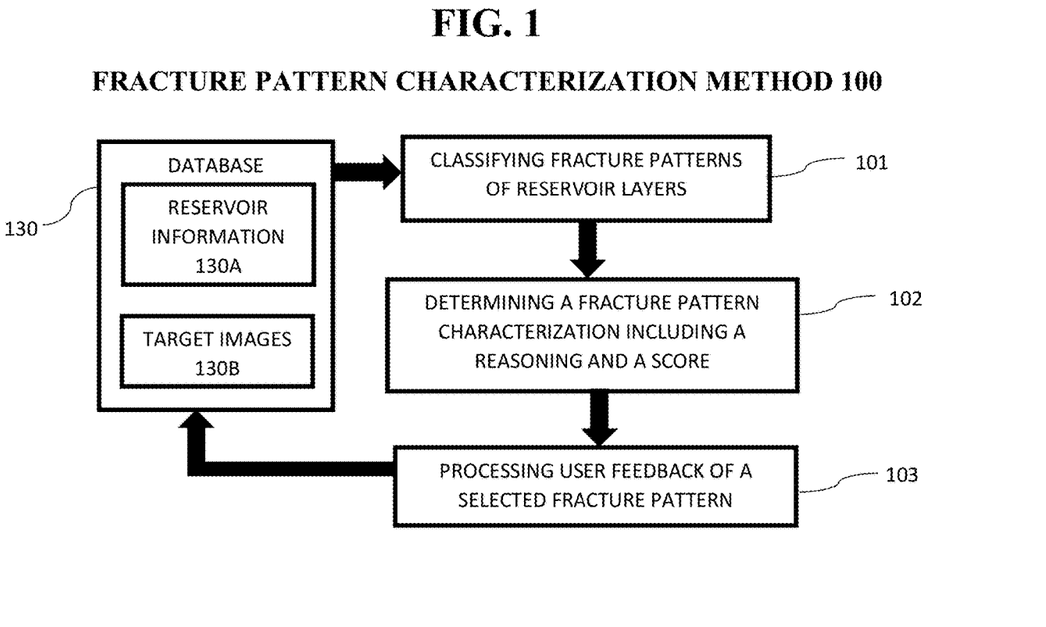
FIG. 1 exemplarily shows a high-level flow chart for a fracture pattern characterization method 100.

With reference now to the example depicted in FIG. 1, the fracture pattern characterization method 100 includes various steps to make use of content-based image analytics and machine learning for fine-grained reservoir analysis, for better fracture characterization and to create a continuously growing knowledge base with open-source and closed-access domain knowledge. As shown in at least FIG. 5, one or more computers of a computer system 12 according to an embodiment of the present invention can include a memory 28 having instructions stored in a storage system to perform the steps of FIG. 1.

Thus, the fracture pattern characterization method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 5-7) may be implemented in a cloud environment 50 (see e.g., FIG. 6), it is nonetheless understood that the present invention can be implemented outside of the cloud environment.

In step 101, fracture patterns (e.g., different fracture patterns) are classified for the reservoir layers of the target reservoir (i.e. reservoir under study) based on the received data from the database 130. The received data comprises reservoir information 130A (e.g. reservoir layer images from previously analyzed reservoirs along with known fracture pattern characterizations that have been made and documented by experts, and target images 130B from target reservoir whose fracture pattern characterizations are unknown). The reservoir information 130A includes, for example, a location, stratigraphic layer, fracture family, images etc. of previously analyzed reservoirs. The target images include well data images, ant-tracking images, and outcrop images.

Well data images may be created by Borehole Imaging Logs. The Borehole Imaging logs are logging and data processing methods used to produce two-dimensional, centimeter-scale images of a borehole wall and the rocks that make it up. The tools can be categorized in a number of ways: energy source (electrical, acoustic, or nuclear), etc. Imaging logs are a valuable tool in both structural and sedimentological interpretations of well data. The well data images can be used to match core-to-log depth, help in facies characterization, and provide accurate dip information for paleocurrent analysis. The well data images are utilized for interpretation of fractures in reservoirs, especially in determining whether fractures are natural.

Ant-Tracking is an algorithm that takes seismic and well data as an input and provides a fracture pattern image as an output to be further analyzed. Ant tracking technology uses the exclusion factors method and azimuthal anisotropy caused by a fracture extraction method to extract cracks information directly from seismic data. The ant tracking property obtains an underground fracture system distribution and can be embodied in three-dimensional space, which allows researchers to describe the fracture system more intuitively and forecast the development of cracks. The ant tracking process available in the software uses a series of unique seismic attributes in a workflow to identify and track faults and fractures, from an unbiased perspective, through 3D seismic volumes. The database includes a plurality of ant-tracking images.

Outcrop images are visible exposures of bedrock or ancient superficial deposits on the Earth's surface. From the outcrop images, fracture pattern images can be derived through expert or algorithmic interpretation. The characterization of fracture networks at outcrops can provide essential information for subsurface reservoir models. Studies of natural fractures in outcrop are important because fractures can reveal the strain history of the host rock and they are economically important as paths for hydrocarbon and water flow.

Thus, the target images include the well data images, the ant-tracking images, and the outcrop images.

The database also includes the reservoir information 130A which includes reservoir layer images from previously analyzed reservoirs along with known fracture pattern characterizations that have been made and documented by experts. Step 101 can utilize a text extraction technique and a natural language processor in combination with an image extraction and Machine Learning classification or similarity technique to predict the fracture pattern characterization of the target reservoir layers, based on 1) learned relationships between reservoir layer images and known values of fracture families in the historical reservoir information 130A (classification) or 2) based on similarities between the target layer images and historical reservoir layer images in 130A (similarity analysis).

Figure 2:
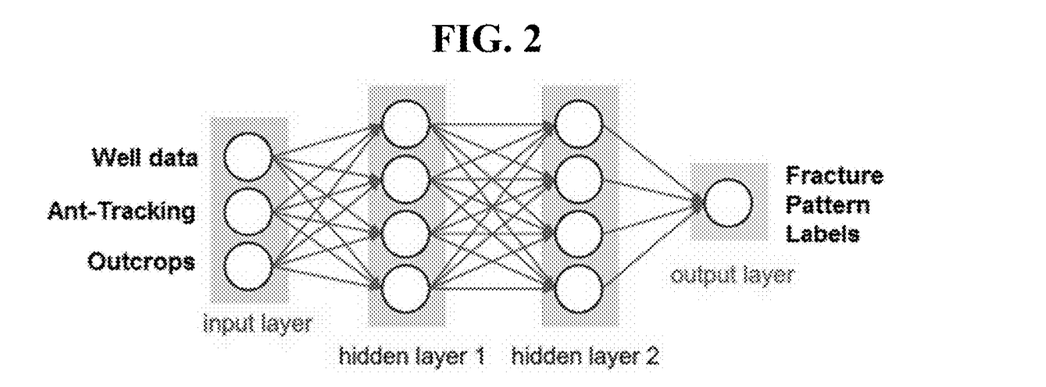
FIG. 2 exemplarily shows a first classifying technique according to step 101.

As exemplarily shown in FIG. 2, a neural network can be utilized in step 101 for the classification task, using as input the well data images, the ant-tracking images, and the outcrop images to classify the fracture patterns of the different target reservoir layers, based on learned relationships (from e.g. neural network model training) between reservoir layer images and known values of fracture families in the historical reservoir information 130A. Alternatively, a similarity classifier can be used as exemplarily shown in FIG. 3. The new target reservoir layer 350 (and its corresponding well, ant-tracking, and outcrop images) is compared with those of the old reservoir layers with the known fracture patterns 360 based on the target images 130B and the corresponding images contained in the historical reservoir information. The similarity classifier predicts the fracture pattern of target reservoir layers based on the known fracture pattern characterizations of the top most similar reservoir layers in historical database 130A (e.g. prediction could be equal to the fracture pattern of #1 most similar reservoir.)

In other words, in step 101, triplets of images from the target reservoir (e.g. from a new target reservoir whose fracture pattern characterizations are unknown) are provided as input into classification model (at least one of either neural network and or similarity classifier model) that has been trained based on the known historical reservoir information 130A. The model is applied on this input to classify the fracture patterns of the target reservoir layers to suggest a fracture pattern characterization based thereon in 102.

In step 102, a fracture pattern characterization of the new target reservoir layers is suggested to user based on classification results in 101. The suggestion may involve fracture pattern predictions from neural network or based on most similar reservoirs as obtained from a similarity comparison between well, ant-tracking, and outcrop images of the new target reservoir layer and those of historical reservoir layers in 130A whose fracture patterns are known. As exemplarily depicted in FIG. 3, two exemplary clusters of known fracture patterns 360 are shown from step 101, and a new reservoir layer 350 is compared to the known fracture patterns 360. Based on a similarity (or other clustering techniques), a fracture pattern characterization of the new reservoir layer 350 is suggested. The fracture pattern characterization includes a similarity score based on how similar the new reservoir layer 350 is to the known fracture patterns 360.

Figure 4:
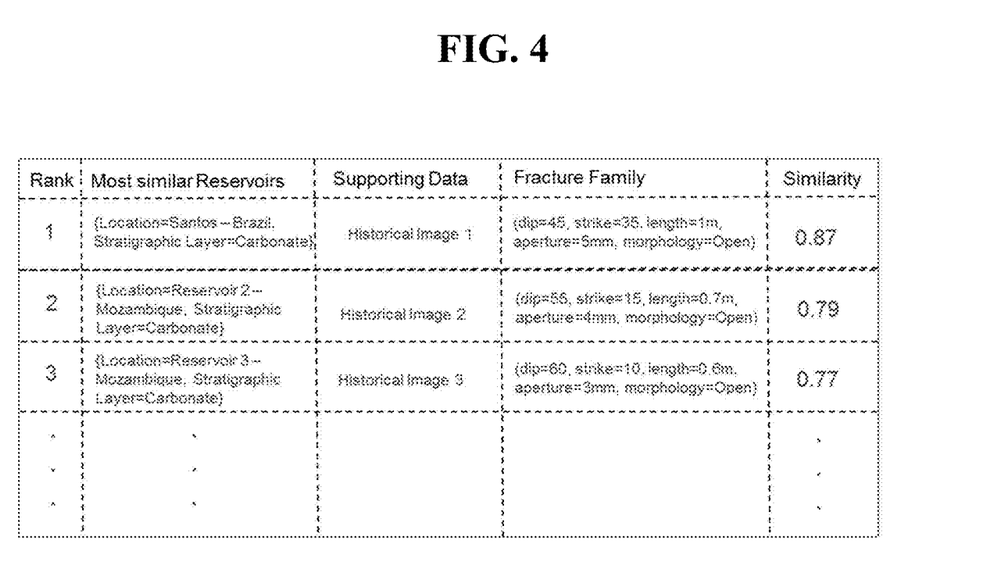
FIG. 4 exemplarily depicts an output of step 102 including a list of fracture pattern characterizations and a score and reasoning thereof.

Referring to FIG. 4, the fracture pattern characterization of the new target reservoir 130B is suggested in 102 with a ranked list of the most similar known reservoirs 130A based on a similarity score defined by the supporting data (e.g., a similarity between known reservoir images 130A and the target images 130B) and the reasoning for the new target reservoir being similar to the known reservoirs (e.g. geolocation, geological context, and images of both the new and the known reservoirs).

In step 103, a user can optionally select which of the fracture patterns suggested in step 102 is "correct" (e.g., most similar or neural network prediction). It is noted that a user may not always take the characterization with the highest similarity score as being the most "correct" if the user has private or proprietary knowledge or has previous experience to dictate otherwise. Based on the user selection of a fracture pattern characterization from the characterization suggestions in step 102 (e.g., selecting one of the fracture patterns in FIG. 4), the selection is processed to correlate the triplet of images to the user selected fracture pattern characterization to store the new correlation in the database 130 for future determinations by steps 101 and 102. In other words, the method "learns" or "updates" the knowledge database 130 based on user feedback in step 103 when the determined fracture pattern characterization including a highest rank is not selected.

Alternatively, the user may also choose not to intervene and may preconfigure the method to automatically choose the most appropriate fracture patterns for the target reservoir layers based on the classifications and suggestions in steps 101 and 102.

Figure 3:
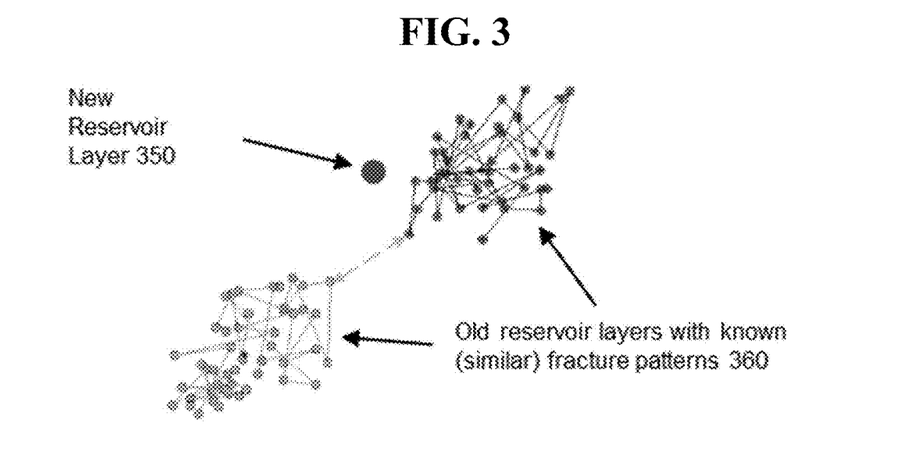
FIG. 3 exemplarily shows a second classifying technique according to step 101.

Based on the feedback in step 103, similarity algorithms or neural network algorithms as exemplarily shown in FIGS. 2-3 to determine a fracture pattern are updated with the new feedback. Thus, the database 130 improves over time with more user feedback and the determinations of fracture patterns accuracy is increased.

In other words, the algorithms to calculate the similarity between the new reservoir and the known reservoir patterns can be refined by user feedback to learn new similarities to provide more accurate future rankings of the characterizations of the layers.

Thereby, the steps 101 to 103 make use of content-based image analytics (e.g., analyzing the target images 130B and the reservoir information 130A) and machine learning for fine-grained reservoir analysis, for better fracture characterization and may create a continuously growing knowledge base with open source information (e.g., the reservoir information 130A and the known target images 130B) and closed-access (e.g., user feedback of selections of patterns) domain knowledge.

In other words, step 101 performs a machine learning classification using a neural network as depicted in FIG. 2, a similarity classification as depicted in FIG. 3, etc. In step 102 the method provides a suggestion to user (e.g. providing user with similarity scores of historical reservoirs that are analogous to the target). The user may, in step 103, weight the evidence and consider system suggestion in 102, but ultimately make the final call as to fracture characterization.

In some embodiments, the classifying classifies the fracture patterns by using at least one of a Machine Learning Classification and a Machine Learning Similarity based analysis. Machine Learning Classification can learn the relationship between layer images (e.g. Well log images, Ant-tracking images, and or outcrop images) and corresponding known fracture pattern characterizations from previously explored (historical) reservoirs whose information are stored in database. Once the classification model is trained (i.e. historical relationships are learned) the model is applied on layer images from target reservoir whose fracture pattern characterization is not known, thus providing fracture pattern characterization predictions/suggestions that can be evaluated by domain expert. Machine Learning Similarity based analysis compares target images (whose fracture pattern characterization is unknown) to historical reservoir layer images in database (whose fracture pattern characterizations are known) and ranks the most similar reservoirs in database (to target). The similarity-based analysis suggests to use one of the fracture family characterizations of the top most similar reservoirs in database.

In either scenario (e.g., classification or similarity based analysis) a user can evaluates the fracture family predictions/suggestions along with any additional evidence (such as visually inspecting images of top ranked reservoir layers, and or comparing the geological context and/or geolocation of the top ranked reservoirs to those of the target reservoir). Upon evaluation, the expert makes a decision on which fracture family is appropriate for target reservoir layer. This decision may involve an intervention such as a manual adjustment (by expert) to system suggestion, but expert may also preconfigure system to automatically select system suggested (e.g. top ranked reservoir) fracture family without user intervention. If expert makes adjustment, system will register such decisions in knowledge base such that system may learn from it.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
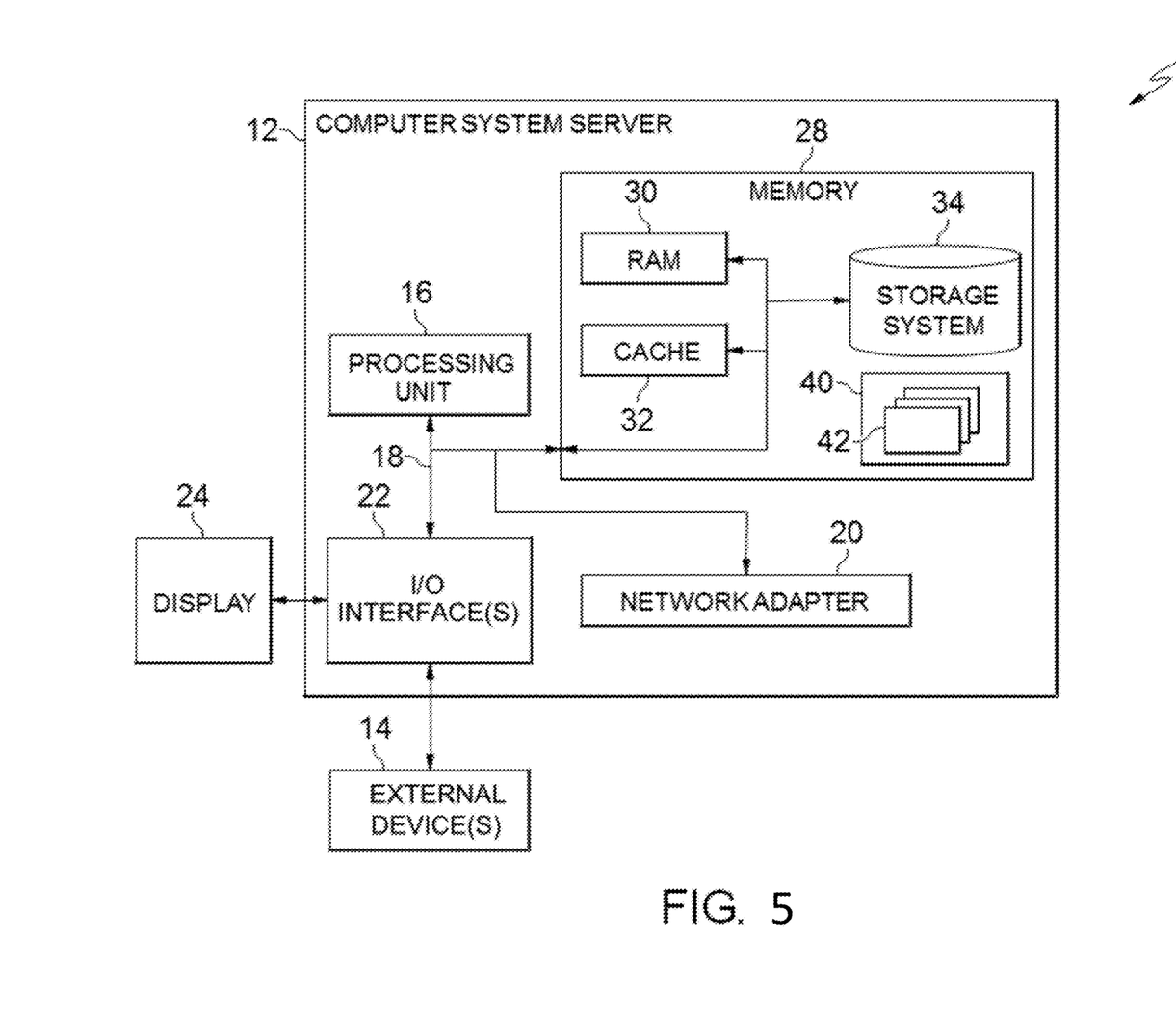
FIG. 5 depicts a cloud computing node 10 according to an embodiment of the present invention.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 5, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
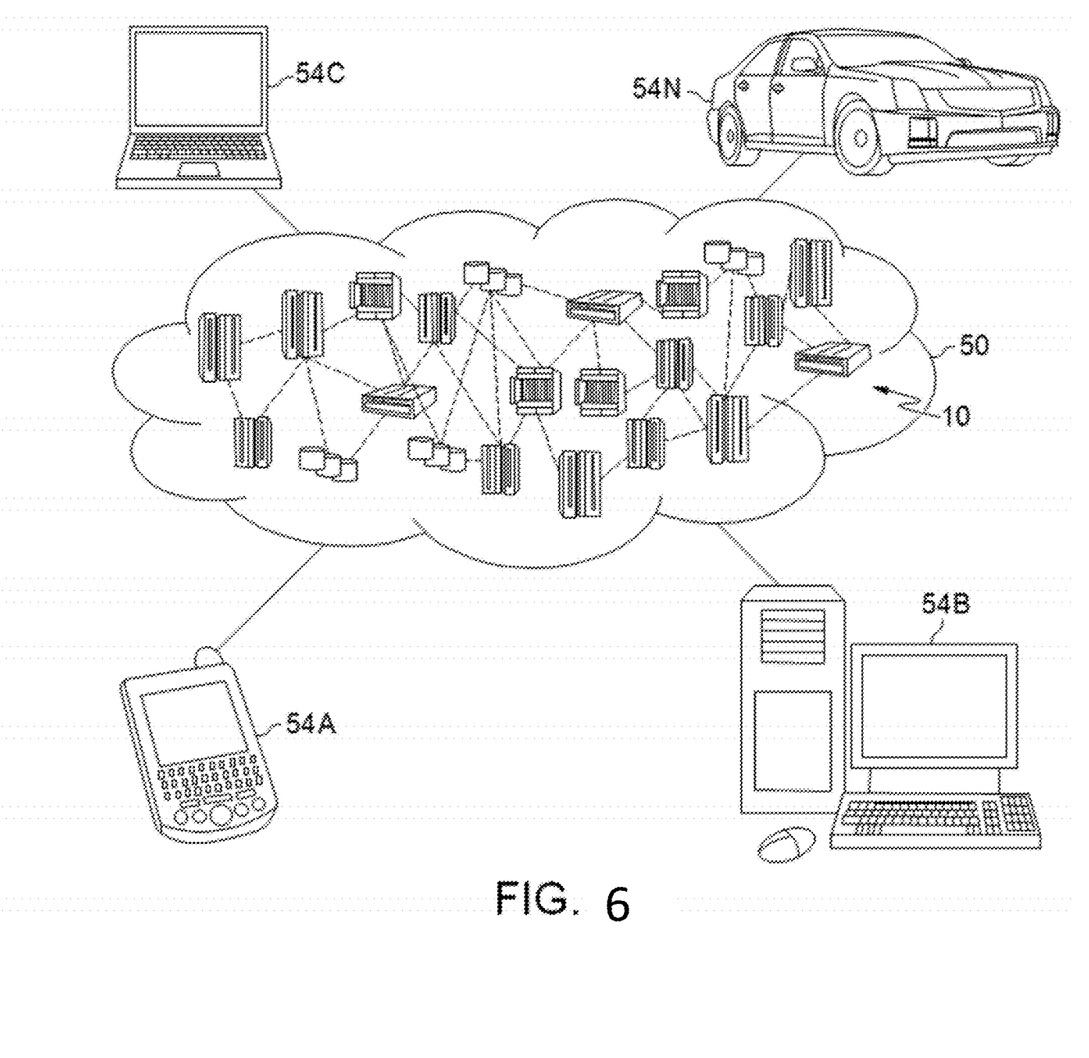
FIG. 6 depicts a cloud computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
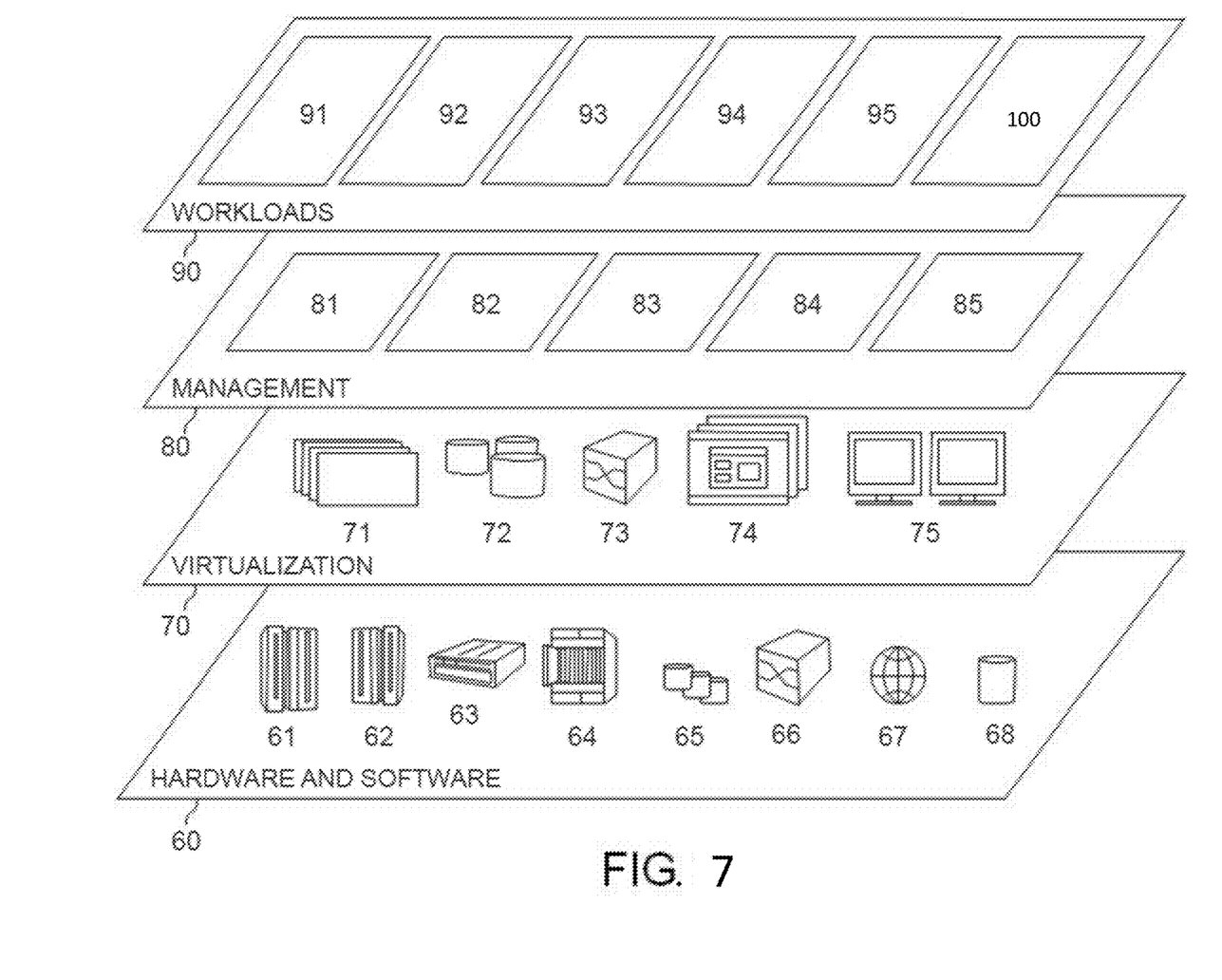
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the fracture pattern characterization method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented fracture pattern characterization method, the method comprising:
    classifying fracture patterns of reservoir layers into a ranked list using a correlation of reservoir information associated with target images and the target images extracted from a database;
    determining a plurality of fracture pattern characterizations of a new reservoir layer input based on the classified fracture patterns;
    querying a user to select one of the plurality of fracture pattern characterizations that is a correct classification; and
    updating the database with the one of the plurality of fracture pattern characterizations selected by the user when the correct classification is not a highest fracture pattern on the ranked list,
    wherein the classifying classifies the fracture patterns by utilizing a text extraction and a natural language processor in combination with an image extraction and a machine learning classification to predict the fracture patterns of the reservoir layers based on learned relationships between reservoir layer images and known values of fracture families in historical reservoir information and based on similarities between the target reservoir layer images and the historical reservoir layer images,
    wherein the user selects one of the plurality of fracture pattern characterizations as a best fit and based on the selection of the one of the fracture pattern characterizations in response to the querying, processing the selection to correlate a triplet of images to the user selected fracture pattern characterization to store a new correlation in the database for a future determinations by the determining,
    wherein the reservoir information and the target images are known and stored in the database, and
    wherein the classifying is iteratively updated on a next determination based on the user labelling the correctly determined fracture pattern characterization.

2. The computer-implemented method of claim 1, wherein the target images comprise at least one of:
    a well data image;
    an ant-tracking image; and
    an outcrop image.

3. The computer-implemented method of claim 1, wherein the reservoir information comprises at least one of:
    a location of the reservoir,
    a stratigraphic layer of the reservoir;
    a size of the reservoir, a morphology of the reservoir, and
a fracture family type of the reservoir.

4. The computer-implemented method of claim 1, wherein the classifying sets a fracture pattern for each of the layers of each of the target images based on the reservoir information of the database, and
wherein the determining determines the fracture pattern characterization of the new reservoir layer according to a similarity between the new reservoir layer and the target images.

5. The computer-implemented method of claim 1, wherein the determining determines a plurality of fracture pattern characterizations for the new reservoir layer, each of the plurality of fracture pattern characterizations being ranked according to a similarity score to the classified fracture patterns and a reason for the similarity.

6. The computer-implemented method of claim 5, further comprising processing a user feedback of a selected fracture pattern characterization of the plurality of fracture pattern characterizations to update the correlation of the reservoir information associated with the target images in the database.

7. The computer-implemented method of claim 1, wherein the classifying classifies the fracture patterns by using at least one of a machine learning classification-based analysis and a machine learning similarity-based analysis.

8. The computer-implemented method of claim 7,
wherein, once the classification model is trained for the correlations, the machine learning model is applied on layer images from the new reservoir layer whose fracture pattern characterization is not known.

9. The computer-implemented method of claim 7, wherein the machine learning similarity-based analysis compares the new reservoir layer input to the target images extracted from the database and ranks most similar reservoirs in the database to the new reservoir layer,
wherein the machine learning similarity-based analysis suggests to use one of a plurality of fracture pattern characterizations of a top similar reservoir of the most similar reservoirs in the database.

10. The computer-implemented method of claim 1, embodied in a cloud-computing environment.

11. A computer program product for fracture pattern characterization, the computer program product comprising a computer-readable storage medium having program instructions embodied therewith, the program instructions executable by a computer to cause the computer to perform:
classifying fracture patterns of reservoir layers into a ranked list using a correlation of reservoir information associated with target images and the target images extracted from a database;
determining a plurality of fracture pattern characterizations of a new reservoir layer input based on the classified fracture patterns;
querying a user to select one of the plurality of fracture pattern characterizations that is a correct classification; and
updating the database with the one of the plurality of fracture pattern characterizations selected by the user when the correct classification is not a highest fracture pattern on the ranked list,
wherein the classifying classifies the fracture patterns by utilizing a text extraction and a natural language processor in combination with an image extraction and a machine learning classification to predict the fracture patterns of the reservoir layers based on learned relationships between reservoir layer images and known values of fracture families in historical reservoir information and based on similarities between the target reservoir layer images and the historical reservoir layer images,
wherein the user selects one of the plurality of fracture pattern characterizations as a best fit and based on the selection of the one of the fracture pattern characterizations in response to the querying, processing the selection to correlate a triplet of images to the user selected fracture pattern characterization to store a new correlation in the database for a future determinations by the determining,
wherein the reservoir information and the target images are known and stored in the database, and
wherein the classifying is iteratively updated on a next determination based on the user labelling the correctly determined fracture pattern characterization.

12. The computer program product of claim 11, wherein the target images comprise at least one of:
a well data image;
an ant-tracking image; and
an outcrop image.

13. The computer program product of claim 11, wherein the reservoir information comprises at least one of:
a location of the reservoir;
a stratigraphic layer of the reservoir;
a size of the reservoir;
a morphology of the reservoir; and
a fracture family type of the reservoir.

14. The computer program product of claim 11, wherein the classifying sets a fracture pattern for each of the layers of each of the target images based on the reservoir information of the database, and
wherein the determining determines the fracture pattern characterization of the new reservoir layer according to a similarity between the new reservoir layer and the target images.

15. The computer program product of claim 11, wherein the determining determines a plurality of fracture pattern characterizations for the new reservoir layer, each of the plurality of fracture pattern characterizations being ranked according to a similarity score to the classified fracture patterns and a reason for the similarity.

16. A fracture pattern characterization system, said system comprising:
a processor; and
a memory, the memory storing instructions to cause the processor to:
classify fracture patterns of reservoir layers into a ranked list using a correlation of reservoir information associated with target images and the target images extracted from a database;
determine a plurality of fracture pattern characterizations of a new reservoir layer input based on the classified fracture patterns;
querying a user to select one of the plurality of fracture pattern characterizations that is a correct classification; and
updating the database with the one of the plurality of fracture pattern characterizations selected by the user when the correct classification is not a highest fracture pattern on the ranked list,
wherein the classifying classifies the fracture patterns by utilizing a text extraction and a natural language processor in combination with an image extraction and a machine learning classification to predict the fracture patterns of the reservoir layers based on learned relationships between reservoir layer images and known values of fracture families in historical reservoir information and based on similarities between the target reservoir layer images and the historical reservoir layer images, wherein the user selects one of the plurality of fracture pattern characterizations as a best fit and based on the selection of the one of the fracture pattern characterizations in response to the query, processing the selection to correlate a triplet of images to the user selected fracture pattern characterization to store a new correlation in the database for a future determinations by the determining, wherein the classifying updates a model for the machine learning classification based on the user labelling the determined fracture pattern characterization as correct, wherein the reservoir information and the target images are known and stored in the database, and wherein the classifying is iteratively updated on a next determination based on the user labelling the correctly determined fracture pattern characterization.

17. The system of claim 16, embodied in a cloud-computing environment.

* * * * *